United States Patent
Molesky et al.

(10) Patent No.: US 7,174,340 B1
(45) Date of Patent: Feb. 6, 2007

(54) INTERVAL-BASED ADJUSTMENT DATA INCLUDES COMPUTING AN ADJUSTMENT VALUE FROM THE DATA FOR A PENDING ADJUSTMENT IN RESPONSE TO RETRIEVAL OF AN ADJUSTED DATA VALUE FROM A DATABASE

(75) Inventors: Lory Molesky, Arlington, MA (US); Robert Hanckel, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 331 days.

(21) Appl. No.: 09/641,223

(22) Filed: Aug. 17, 2000

(51) Int. Cl.
  *G06F 17/00* (2006.01)
  *G06F 17/30* (2006.01)
  *G06F 15/00* (2006.01)

(52) U.S. Cl. .................. 707/102; 707/3; 707/104.1; 702/180

(58) Field of Classification Search .............. 707/1–10, 707/100–104.1, 200–205, 45–50; 702/177–184, 702/176; 705/1–12, 30–38; 370/232–234, 370/468; 706/21
See application file for complete search history.

(56) References Cited

U.S. PATENT DOCUMENTS

| | | | | |
|---|---|---|---|---|
| 551,024 A | * | 12/1895 | Wright ..................... 91/346 |
| 5,220,500 A | * | 6/1993 | Baird et al. ............... 705/36 R |
| 5,267,348 A | * | 11/1993 | Someya et al. ............. 706/52 |
| 5,347,452 A | * | 9/1994 | Bay, Jr. ..................... 705/37 |
| 5,412,769 A | * | 5/1995 | Maruoka et al. ........... 345/440 |
| 5,414,838 A | * | 5/1995 | Kolton et al. ............. 707/104.1 |
| 5,446,575 A | * | 8/1995 | Lysakowski, Jr. ......... 707/104.1 |
| 5,454,104 A | * | 9/1995 | Steidlmayer et al. .......... 707/4 |
| 5,594,898 A | * | 1/1997 | Dalal et al. .................... 707/2 |
| 5,630,070 A | * | 5/1997 | Dietrich et al. ................ 705/8 |
| 5,761,386 A | * | 6/1998 | Lawrence et al. ............ 706/20 |
| 5,774,878 A | * | 6/1998 | Marshall .................. 705/36 R |
| 5,778,371 A | * | 7/1998 | Fujihara ..................... 707/100 |
| 5,873,091 A | * | 2/1999 | Garth et al. ................. 707/102 |
| 5,946,666 A | * | 8/1999 | Nevo et al. .................... 705/36 |
| 5,966,139 A | * | 10/1999 | Anupam et al. ............. 345/440 |

(Continued)

FOREIGN PATENT DOCUMENTS

EP   0897149 A1 *   2/1999   ...................... 9/46

(Continued)

OTHER PUBLICATIONS

Kwan et al., Efficient Encoding and rendering of time-varying volume data, Institute for computer applications in science and engineering, NASA Langley research center, VA, NASA/CR-1998-208424 ICASE Report No. 98-22, Jun. 1998.*

(Continued)

*Primary Examiner*—Srirama Channavajjala
(74) *Attorney, Agent, or Firm*—Chapin IP Law, LLC; Barry W. Chapin, Esq.

(57) ABSTRACT

Interval-based adjustments to data are applied by a relational database engine. The engine stores raw, unadjusted data values in a separate table from adjustment values. The adjustment values are dynamically updated in response to a new adjustment interval. The adjustments are applied to the raw data during retrieval from the database. This results in an efficient and transparent adjustment to data.

60 Claims, 5 Drawing Sheets

U.S. PATENT DOCUMENTS

| | | | |
|---|---|---|---|
| 6,026,381 A * | 2/2000 | Barton et al. | 705/35 |
| 6,029,146 A * | 2/2000 | Hawkins et al. | 705/35 |
| 6,094,650 A * | 7/2000 | Stoffel et al. | 707/3 |
| 6,108,004 A * | 8/2000 | Medl | 715/804 |
| 6,125,105 A * | 9/2000 | Edwards et al. | 370/230 |
| 6,163,781 A * | 12/2000 | Wess, Jr. | 707/103 X |
| 6,195,103 B1 * | 2/2001 | Stewart | 345/440 |
| 6,243,696 B1 * | 6/2001 | Keeler et al. | 706/21 |
| 6,256,628 B1 * | 7/2001 | Dobson et al. | 707/6 |
| 6,272,332 B1 * | 8/2001 | Matsumoto et al. | 455/412.1 |
| 6,272,474 B1 * | 8/2001 | Garcia | 705/37 |
| 6,317,728 B1 * | 11/2001 | Kane | 705/37 |
| 6,321,212 B1 * | 11/2001 | Lange | 705/36 R |
| 6,338,067 B1 * | 1/2002 | Baker et al. | 707/100 |
| 6,401,091 B1 * | 6/2002 | Butler et al. | 707/10 |
| 6,415,268 B1 * | 7/2002 | Korisch | 705/36 |
| 6,553,383 B1 * | 4/2003 | Martin | 707/102 |
| 6,709,330 B1 * | 3/2004 | Klein et al. | 463/9 |
| 6,731,990 B1 * | 5/2004 | Carter et al. | 700/52 |
| 6,742,150 B1 * | 5/2004 | Ghameshlu et al. | 714/727 |
| 6,751,597 B1 * | 6/2004 | Brodsky et al. | 705/37 |
| 6,754,657 B2 * | 6/2004 | Lomet | 707/8 |
| 6,810,414 B1 * | 10/2004 | Brittain | 709/219 |
| 6,850,906 B1 * | 2/2005 | Chadha et al. | 705/36 R |
| 6,975,996 B2 * | 12/2005 | Lawrence et al. | 705/1 |
| 2001/0025264 A1 * | 9/2001 | Deaddio et al. | 705/36 |
| 2001/0034701 A1 * | 10/2001 | Fox et al. | 705/38 |
| 2002/0004774 A1 * | 1/2002 | Defarlo | 705/36 |
| 2002/0032696 A1 * | 3/2002 | Takiguchi et al. | 707/500.1 |
| 2002/0099636 A1 * | 7/2002 | Narumo | 705/36 |
| 2002/0099640 A1 * | 7/2002 | Lange | 705/37 |
| 2003/0120577 A1 * | 6/2003 | Sakui et al. | 705/36 |
| 2004/0128225 A1 * | 7/2004 | Thompson et al. | 705/37 |

FOREIGN PATENT DOCUMENTS

| | | | | |
|---|---|---|---|---|
| WO | WO99/32999 | * | 7/1999 | 17/30 |
| WO | WO 01/15079 | * | 3/2001 | 3/2 |
| WO | WO01/46771 | * | 6/2001 | |
| WO | WO 2004/084092 | * | 9/2004 | 17/30 |
| WO | WO 01/077963 | * | 10/2004 | 17/60 |
| WO | WO2005077123 A2 * | 8/2005 | | |

OTHER PUBLICATIONS

Asset control market data management, Business and functional concepts, May 1999, version:0.1, pp. 1-15.*

Informix: printed in USA Jul. 1999, pp. 1-27.*

Rakesh et al., Managing temporal financial data in an extensible database, proceedings of the 19th VLDB conference, 1993, p. 302-313.*

Werner Dreyer et al. "Requirements and design of replication services for a time series management system", IEEE 1996, pp. 208-215.*

Huanmei Wu et al., "Subsequence matching on structured time series data", SIGMOD ACM, 2005, 12 pages.*

Anthony B Atkinson et al. "producing time series data for income distribution: sources, methods, and techniques", May 2000, 33 pages.*

Harry Hochheiser et al. "dynamic query tools for time series data sets: timebox weidgets for interactive exploration", Information visualization, Jun. 2003, 1-18 pages.*

Andrew A Norton et al. "streaming graphics", Dec. 2000, pp. 1-7.*

Thomas Neal Falkenberry, "high frequency data filtrting", 2002 Tick Data Inc20 pages.*

Marc Morell et al. "Hydrometeorological data acquistion, transmission and dissemination through the MED_HYCOS project", Kauzanne, Setp 1999, 9 pages.*

Lindstrom,J, et al. "dynamic adjustment of serialization order using time-stam pintervals in real-time databases", Sixth internatioanl conference on real-time computing systems and applications, 1999, pp. 13-20.*

Falkenroth,E, :Computational indexes for time series, either international proceedings on scientific and statistical database system, 1996, 1996, pp. 242-251.*

* cited by examiner

| STOCK TABLE | | | | |
|---|---|---|---|---|
| SYMBOL | TIMESTAMP | ... | CLOSE | ... |
| | | ⋮ | | |
| ACME | D0 | | 10 | |
| | | ⋮ | | |
| ACME | D1 | | 30 | |
| | | ⋮ | | |
| ACME | D2 | | 30 | |
| | | ⋮ | | |
| ACME | D3 | | 80 | |
| | | ⋮ | | |
| ACME | D4 | | 40 | |
| | | ⋮ | | |
| ACME | D5 | | 50 | |
| | | | | |

| MAP TABLE | |
|---|---|
| SYMBOL | SPLIT TABLE |
| ⋮ | ⋮ |
| SYMBOL | ACME_SPLITS_TABLE |
| ⋮ | ⋮ |

| ACME_SPLITS_TABLE | | | | |
|---|---|---|---|---|
| EFFECTIVE_DATE | END_DATE | NUMERATOR | DENOMINATOR | FACTOR |
| MINDATE | D2 | 1 | 1 | 6 |
| D2 | D4 | 3 | 1 | 2 |
| D4 | MAXDATE | 2 | 1 | 1 |

FIG. 4

| ACME_SPLITS_TABLE /19 | | | | |
|---|---|---|---|---|
| EFFECTIVE_DATE | END_DATE | NUMERATOR | DENOMINATOR | FACTOR |
| MINDATE | MAXDATE | 1 | 1 | 1 |
| | | | | |
| | | | | |

FIG. 5A

| ACME_SPLITS_TABLE /19 | | | | |
|---|---|---|---|---|
| EFFECTIVE_DATE | END_DATE | NUMERATOR | DENOMINATOR | FACTOR |
| MINDATE | D2 | 1 | 1 | 3 |
| D2 | MAXDATE | 3 | 1 | 1 |
| | | | | |

FIG. 5B

| ACME_SPLITS_TABLE /19 | | | | |
|---|---|---|---|---|
| EFFECTIVE_DATE | END_DATE | NUMERATOR | DENOMINATOR | FACTOR |
| MINDATE | D2 | 1 | 1 | 6 |
| D2 | D4 | 3 | 1 | 2 |
| D4 | MAXDATE | 2 | 1 | 1 |

FIG. 5C

INTERVAL-BASED ADJUSTMENT DATA INCLUDES COMPUTING AN ADJUSTMENT VALUE FROM THE DATA FOR A PENDING ADJUSTMENT IN RESPONSE TO RETRIEVAL OF AN ADJUSTED DATA VALUE FROM A DATABASE

BACKGROUND

For many applications, data is stored in a database as a time series of data values. The data retrieved from the database may need to be adjusted for events. In particular, it may be desirable to apply an interval-based adjustment (IBA) to the data.

Examples of interval-based adjustments include the application of stock splits and currency conversions. Such adjustments may also be used to reflect dividend distributions from stocks and mutual funds. These adjustment triggers are typically infrequent events.

To reduce rounding and precision errors, the time series data is typically stored as unadjusted data values. When the data is stored in its unadjusted form, the data would be adjusted on retrieval to reflect the adjustments. For example, on retrieval of stock prices, one may like to see all data adjusted based on the current price taking into consideration the stock's split and dividend history. Using the adjusted data, the performance of the security over time can be accurately ascertained and presented to the user. Typically, the adjustments are applied using custom programming.

SUMMARY

The custom programming approach has at least two disadvantages. In the first place, each installation may have to write custom programs to solve the problem. This need to develop custom code for each database increases development costs. In addition, the performance of the resulting custom program tends to be slow. A contributor to the slow performance is the use of multiple scans of the data to first retrieve the data and then to apply any adjustments. Another contributor is the additional memory overhead to store the date while it is being processed.

A better approach exploits the high performance of a database engine. The database engine can retrieve and apply the appropriate adjustment factors for each data element in a time series. In particular, the database engine is a relational database engine. From a user's perspective, the adjustment can be applied transparently.

In a particular embodiment, a database stores a plurality of raw data values organized as a series in a first database structure. The data can be a time series of data, such as financial data. A plurality of intervals of adjustment data are stored in a second database structure. The adjustment data includes an adjustment value for each interval. Furthermore, the adjustment values can be dynamically updated to reflect additional intervals of adjustment data being added to the database.

For a user to query the database for adjusted data values, the first and second database structures are associated. This can be done by creating a view of the database that includes the two structures. This can be done by a system administrator. The user query then applies the adjustment values to the raw data values to yield adjusted data for presentation to a user.

The database can also store data for pending adjustments. In particular, the second database structure can include adjustment data for the pending adjustment. In response to a query for adjusted data using the pending adjustment, an adjustment value for each interval can be computed using the pending adjustment data and applied to the raw data values.

BRIEF DESCRIPTION OF THE DRAWINGS

The foregoing and other objects, features and advantages of the system will be apparent from the following more particular description of embodiments, as illustrated in the accompanying drawings in which like reference characters refer to the same parts throughout the different views. The drawings are not necessarily to scale, emphasis instead being placed upon illustrating the principles of the invention.

FIG. 4 is a block diagram illustrating the tables of FIG. 3 populated with data for the chart of FIG. 1.

FIGS. 5A–5C are block diagrams illustrating the recording of stock split data in the splits table of FIG. 4.

DETAILED DESCRIPTION

Embodiment of the system can be practiced on various time series data models, including, but not limited to, stock splits, dividend distributors, currency conversion, and expense adjustments. For ease and clarity of description, the system will be described with reference to stock splits.

Figure 1:
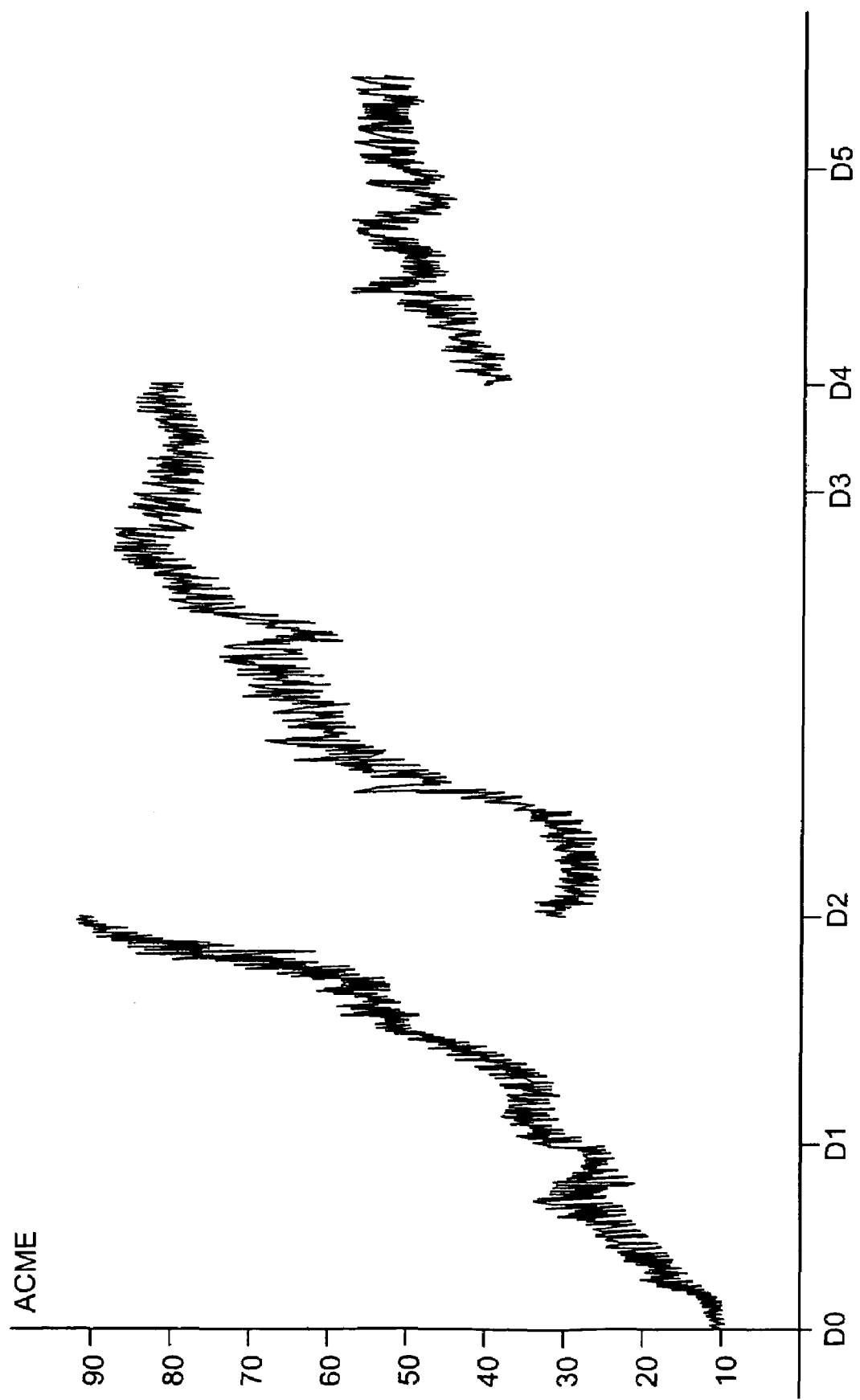
FIG. 1 is a graphical representation of a stock data time series.

FIG. 1 is a graphical representation of a stock data time series. The graph illustrates hypothetical time series data, such as daily closing prices of a stock having the ticker symbol "ACME". As illustrated, the stock has undergone two stock splits, a 3-for-1 split effective on a particular date, D2, and a 2-for-1 split effective on a later date, D4. A user may want to adjust the stock prices to account for the splits. This can be done by either looking forward from a date or looking backward from a date.

As an example of a forward-looking adjustment, a user may want to determine the current value of a share of stock purchased on a particular date, D1, D3, D5. A share purchased on the first date D1 at $30/share would have a value of $30 on that date, D1. At a subsequent date D3, the stock closed at $80/share. Because of the 3-for-1 split on the first split date D2, the user would have 3 shares, instead of 1, valued at $240. The investment has increased 8-fold. At a still later date D5, the stock closed at $50/share. Because of the 3-for-1 split on the first split date D2 and the 2-for-1 split on the second split date D4, the user would have 6 shares, valued at $300. The investment has now increased 10-fold. From the adjusted data, the user can determine the gain of the investment over time.

One example of adjusting backward in time is a moving average. The discontinuity created by the splits should be adjusted to obtain an accurate moving average. To obtain adjusted data, the prices between the split dates D2, D4 is divided by the second split factor, 2. For example, the stock at date D3 is valued at $40/shore in the current valuation. Price data before the first split date D2 is divided by the first and second split factors, 3*2=6. For example, the stock at date D1 is valued at $5/share in the current valuation.

Figure 2:
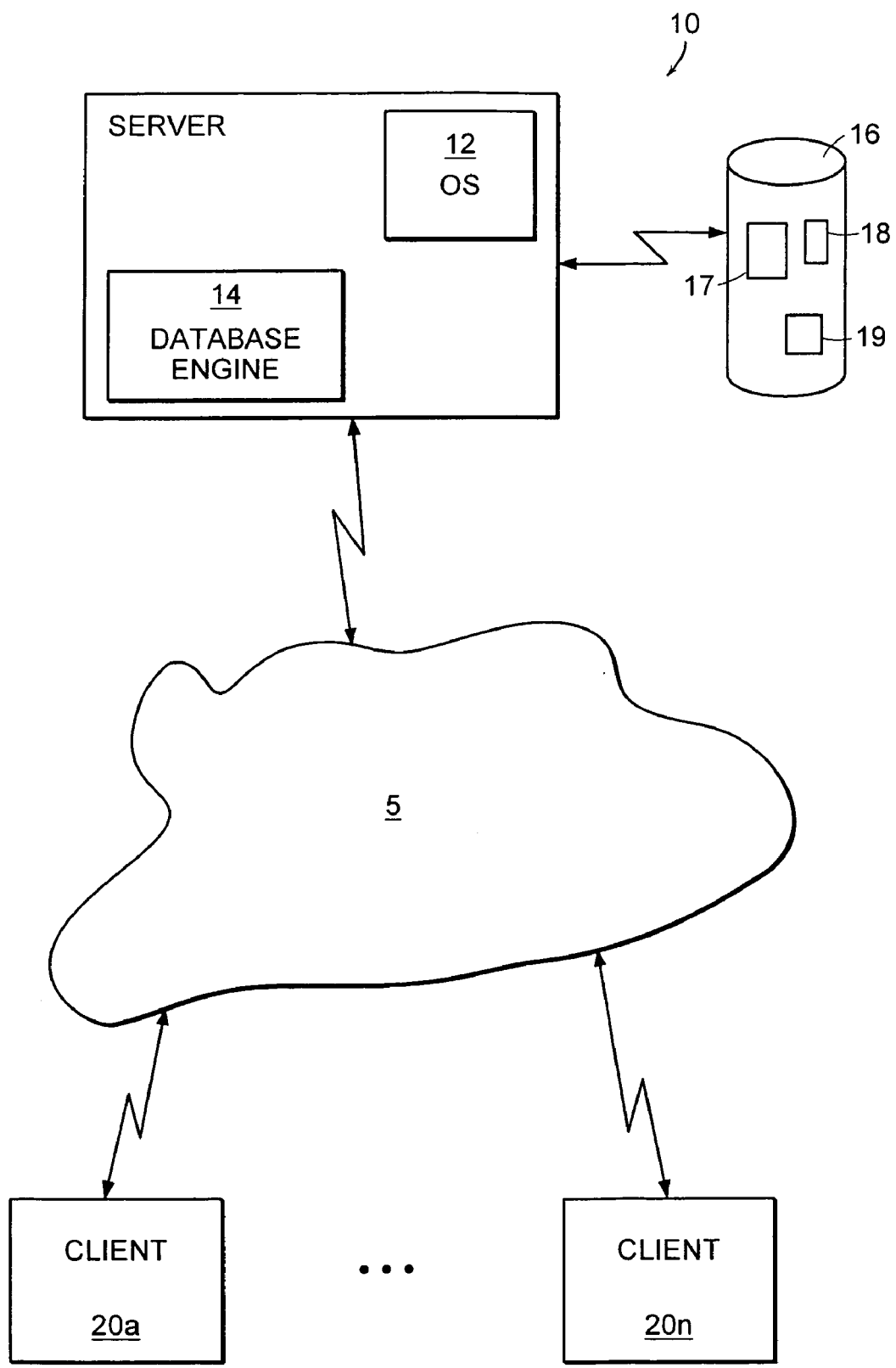
FIG. 2 is a block diagram of a computing system for applying interval-based adjustments.

FIG. 2 is a block diagram of a computing system for applying interval-based adjustments. As illustrated, a server computer 10 is interconnected to one or more client computers 20a, . . . ,20N via a communications medium 5. The communications medium 5 can be any suitable medium, including wired or wireless. The communications medium 5 can directly connect the client 20 and server 10, or it can be a public communications system, such as the Internet. It should be understood, that a client-server architecture is not required for the system, the methods described herein can also be employed in a standalone computer system and in multi-tiered computing systems.

The server 10 can be a single computer or a plurality of clustered computers. The server 10 includes an operating system (OS) 12 and a database engine 14 layered over the operating system 12. Together the operating system 12 and the database engine 14 cooperate to manage a database 16. In particular, the database 16 is a relational database that stores time-series data and the database engine 14 is Oracle8i, commercially available from Oracle Corporation, Redwood Shores, Calif.

The database 16 can include three relational database table structures. A map table 18 maps a reference symbol to an adjustment table 19. In the particular example described below, the time-series data is daily raw (i.e., unadjusted) stock price data and the adjustments are stock splits. For this example, the reference symbol is a stock ticker symbol. The map table 18 thus maps the ticker symbol to splits table 19.

Database queries can be initiated by a client computer 20a. The server 10 uses the database engine 14 to retrieve data from the database 16 to satisfy the query. Results are returned to the client computer 20a for display to a user. These results are automatically adjusted using data from the adjustment table 19.

Methods for applying the adjustment data exploit the high performance of the relational database engine 14 to retrieve and apply the appropriate split factor for each element in a pricing time series. Furthermore, from the user's perspective, applying the split factor is performed transparently.

Figure 3:
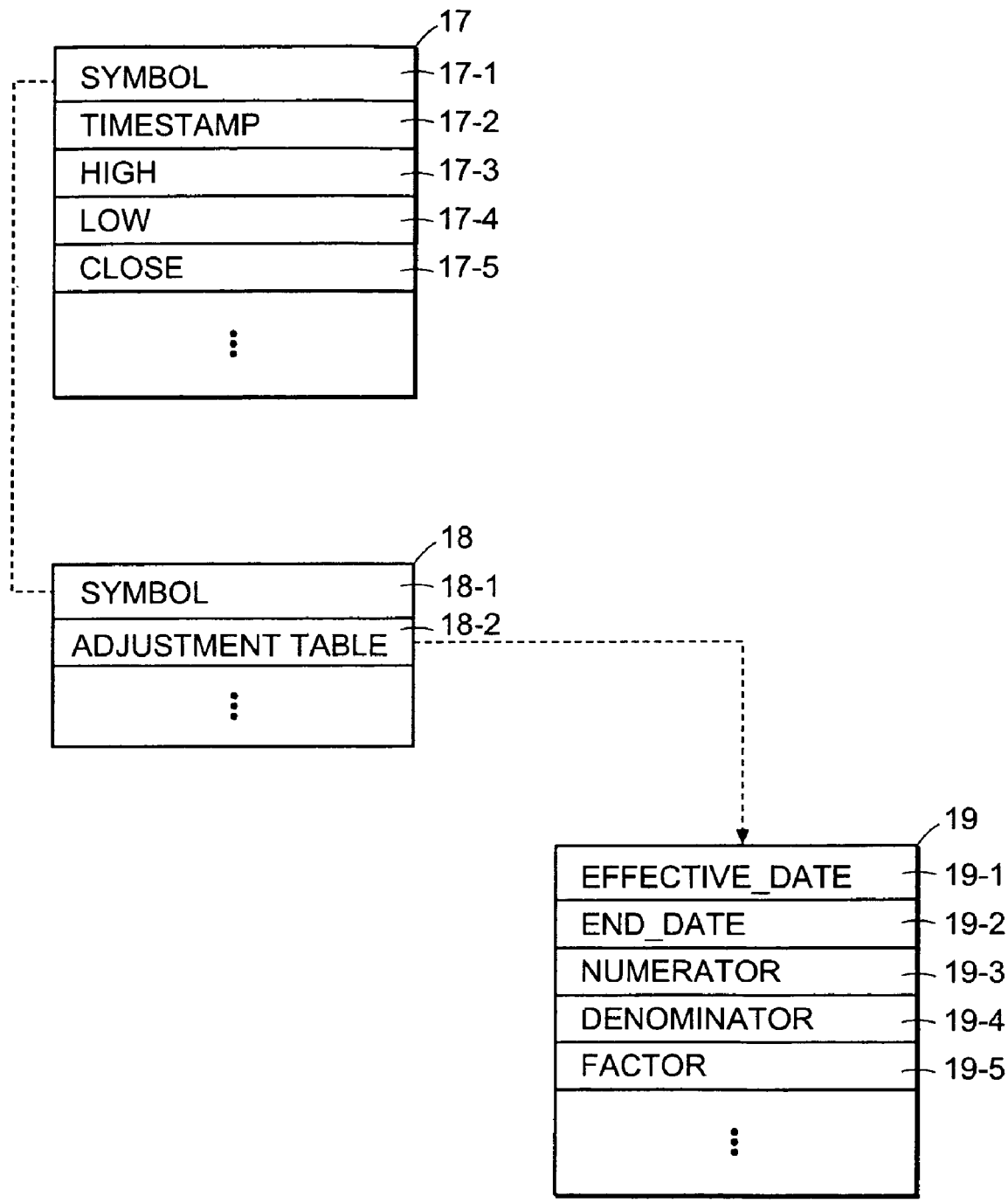
FIG. 3 is a block diagram of the database tables of FIG. 2.

FIG. 3 is a block diagram of the database tables of FIG. 2. The stock table 17, as shown, includes five fields. The stock's ticker symbol is stored as text in a symbol field 17-1. The date of the trade recorded is stored in a timestamp date field 17-2. The high, low, and closing prices of the stock are stored in three numeric fields: high 17-3, low 17-4, and close 17-5. The stock table 18 includes one record for each day the stock is traded, keyed by the symbol field 17-1.

The map table 18, as shown, includes two fields: a symbol character field 18-1, and an adjustment table field 18-2. The symbol field 18-1 stores the stock ticker symbol. The adjustment table field 18-2 can be a text field or a pointer field that dereferences to the splits table 19 for the stock identified in the symbol field 18-1.

The splits table 19, as shown, includes five fields. Each record in the splits table 19 is associated with one interval. An effective_date date field 19-1 records the effective date of an adjustment (split) and an end_date date field 19-2 records the date of the next split adjustment. The split information for the interval between the effective date and the end date is recorded in the numerator integer field 19-3 and the denominator integer field 19-4. The factor value to convert prices during this interval period to current valuations is stored in the factor numeric field 19-5.

Every time a new entry is entered into the splits table 19, reflecting a new split, the factor field 19-5 for each entry is recalculated. The factor is computed from the cumulative products of the numerators and denominators as follows:

$$\text{factor}_i = \frac{\prod_{j=i+1}^{N} \text{numerator}_j}{\prod_{j=i+1}^{N} \text{denominator}_j}$$

where i is the entry position in the splits table 19, beginning from 1; and

N is the total number of entries in the splits table 19.

In a particular embodiment, the recalculation of the factor fields 19-5 are performed by the database engine 14 (FIG. 2) in response to the addition of a new table entry.

FIG. 4 is a block diagram illustrating the tables of FIG. 3 populated with data for the chart of FIG. 1. For convenience, only the closing price data for the security "ACME" is shown in the stock table 17. The map table 18, associates the security "ACME" with an adjustment table "ACME_SPLITS_ TABLE". In the splits table 19, the initial effective date, for the first interval (i=1), is set equal to a sufficiently low data such as the lowest limit of the data fields, MINDATE. Likewise, the end date for the last interval is set equal to MAXDATE, which can be the upper limit of the date field. Newly announced splits are recorded in the splits table 19. As shown in the splits table 19, pricing data during the first interval must be factored by 6 to be expressed in current valuations.

FIGS. 5A–5C are block diagrams illustrating the recording of stock split data in the splits table of FIG. 4. The initial condition, before any split, is illustrated by FIG. 5A. As shown, there is one entry (N=1), which directs the system to retrieve data as it is, essentially by multiplying all prices between MINDATE and MAXDATE by 1.

After the first (3-for-1) split, the splits table 19 is illustrated by FIG. 5B. As shown, the splits table 19 has two entries (N=2), which direct the system to divide prices by 3 for dates between MINDATE and D2 and to divide prices by 1 for dates between D2 and MAXDATE.

After the second (2-for-1) split, the splits table 19 takes on its final form, as also illustrated by FIG. 5C. As shown, the splits table 19 has three entries (N=3). The system divides prices by 6 for dates between MINDATE and D2, divides prices by 2 for dates between D2 and D4, and divides prices by 1 for dates between D4 and MAXDATE.

Structured Query Language (SQL) queries reference the splits table 19 and the stock table 17 to automatically perform price adjustments. This price adjustment is implemented with a view, which allows the transparent application of the adjustments. The SQL query makes use of the effective date field 19-1 and the end date field 19-2 to automatically and efficiently apply the appropriate split factor upon retrieval of the price date. In particular, the effective and end date columns 19-1, 19-2 are used in retrieval queries' WHERE clause to select the appropriate price adjustment from the splits table 19.

In a particular embodiment using Oracle8i, the splits table 19 is implemented as a nested table (SplitSeriesTab) of records (SplitSeriesCells). The queries posed by the user to retrieve data adjusted for splits are expressed almost identical to a SQL query that would retrieve unadjusted data. Specifically, to retrieve data adjusted for splits, the user substitutes the name of the underlying table holding the pricing data with a view. That is, the SELECT * FROM stock_table clause to retrieve unadjusted data, is rewritten as:

SELECT * FROM adjusted_view to retrieve the prices adjusted for splits.

The view that accomplishes the adjustment for the price table having high and close pricing columns is:

```
CREATE VIEW adjusted_view (symbol, timestamp, close, high);
   AS SELECT  stock.symbol,
              stock.timestamp,
              stock.close/splits.factor,
              stock.high/splits.factor
       FROM stock_map map, stock_table stocks,
              TABLE (cast
                 (map.sf.series as TSDEV.SplitSeriesTab)) splits
       WHERE map.symbol = stocks.symbol AND
              stocks.timestamp > splits.effective_date AND
              stocks.timestamp < splits.end_date;
```

Pricing data selected from the stock table 17 is adjusted by:
1) dividing the price by the factor column of the splits table 19;
2) the appropriate split factor is determined by the WHERE clause, which chooses the split factor based on the timestamp of each pricing row; and
3) in the implementation of this view, stock_map is used to support the selection of various securities.

This view-based pricing adjustment is extremely efficient because it exploits simple range query technology of the database engine that references indexes based on the date column of the pricing table.

An administrator may also want to insert "pending splits" into the splits table. Pending splits are those that have been announced but have not yet become effective.

The previous solution relies on a split factor column that is always current, that is, the split factor column must be recomputed prior to the first retrieval of unadjusted data on or after the effective date of a new split.

There are many ways to enforce this property, such as:
Only insert new splits on the effective date of the split. On insert, recompute the split factor column based on the cumulative product of the numerator and denominators.
Allow pending splits to be inserted into the splits table, but define a time-based trigger to recompute the split factor column at the effective_date of the pending split.

Both of these solutions require that the administrator set up the proper maintenance scripts.

Below is an alternative solution that handles pending splits, but does not require additional maintenance scripts. The solution is based on a view that recomputes the proper split factors based on the current date:

```
CREATE VIEW estimate_adjusted (symbol,
                              timestamp, close, high);
   AS SELECT stocks.symbol,
             stocks.timestamp,
             stocks.close/(n/d),
             stocks.high/(n/d)
       FROM stock_map map, stock_table stocks,
           (SELECT PROD (split2numerator) n, PROD (split2denomerator) d
            FROM TABLE
               stock_map map2, stock_table stocks2,
               (cast (map.sf.series as TSDEV.SplitSeriesTab)) splits2
               WHERE map2.symbol = stocks2.symbol AND
               splits2.effective_date < SYSDATE;)
           stocks2.timestamp > splits2.effective_date AND
           stocks2.timestamp < splits2.end_date;
           WHERE map.symbol = stocks.symbol
```

Here, SYSDATE is the current date/time of the computing system. This view is similar to the previous view, but extended with a subqueury. The subqueury computes the cumulative product of numerators and denominators from the splits table.

It may also be desirable to apply multiple interval-based adjustments to time series data. For example, a stock price may be adjusted due to both splits and distributions. The database engine 14 can handle these multiple adjustments, either in parallel or series. First, the map table 18 can have more than one column per stock, one dereferencing to the splits table and another dereferencing to the distribution table. To apply the adjustments in parallel, a view can be created using the multiple adjustment tables. Applying the adjustments in series may be more difficult because the adjustments should be applied in time order.

Those of ordinary skill in the art will recognize that methods involved in the interval-based adjustment system may be embodied in a computer program product that includes a computer usable medium. For example, such a computer usable medium can include a readable memory device, such as a solid state memory device, a hard drive device, a CD-ROM, a DVD-ROM, or a computer diskette, having computer readable program code segments stored thereon.

While this system has been particularly shown and described with references to particular embodiments, it will be understood by those skilled in the art that various changes in form and details may be made without departing from the scope of the invention encompassed by the appended claims.

What is claimed is:

1. In a computer system, a method of applying interval-based adjustments to data in a database, wherein the database is stored within, and accessible via, the computer system, the method comprising:
   storing a plurality of raw data values organized as a series in a first database structure in the computer system;
   for the series of raw data values, storing a plurality of intervals of adjustment data in a second database structure in the computer system, each interval of adjustment data including an adjustment value to be applied to raw data values over a range specified in the series, and wherein the adjustment data includes data for a pending adjustment;
   computing an adjustment value from the data for a pending adjustment in response to retrieval of an adjusted data value from the database; and
   associating the first and second database structures in the computer system so the adjustment value is applied to the series of raw data values in response to retrieval of an adjusted data value from the database in the computer system to provide a user, via the computer system, the adjusted data values corresponding to said raw data values and said adjustment value.

2. The method of claim 1 further comprising:
   computing the adjustment value for each interval of adjustment data in response to the addition of a subsequent interval of adjustment data.

3. The method of claim 1 wherein associating comprises mapping the second database structure to the first database structure.

4. The method of claim 1 wherein the raw data values represent a time series.

5. The method of claim 4 wherein the time series tracks financial data.

6. The method of claim 5 wherein the financial data is a currency valuation.

7. The method of claim 5 wherein the financial data is a securities valuation.

8. The method of claim 4 wherein associating comprises creating a view of the database that includes the raw data values and the adjustment value.

9. In a computer system, a method of applying interval-based adjustments to data in a database, wherein the database is stored within, and accessible via, the computer system, the method, comprising:
   storing a plurality of raw data values organized as a time series in a first database structure in the computer system;
   for the time series, storing a plurality of intervals of time-based adjustment data in a second database structure in the computer system, each interval of time-based adjustment data including an adjustment value to be applied to raw data values over a specified range in the series, and wherein the adjustment data includes data for a pending adjustment;
   computing an adjustment value from the data for a pending adjustment in response to retrieval of an adjusted data value from the database;
   creating a view of the database in the computer system to include the first and second database structures; and
   in response to a query for adjusted data values, input to the computer system by a user, using the view to apply the adjustment value to the raw data values during retrieval of the raw data from the database in the computer system to provide the user with the adjusted data values corresponding to said raw data values and said adjustment value via the computer system.

10. The method of claim 9 further comprising computing the adjustment value for each interval of adjustment data in response to the addition of a subsequent interval of adjustment data.

11. The method of claim 9 wherein creating the view comprises mapping the second database structure to the first database structure.

12. The method of claim 9 wherein the time series tracks financial data.

13. The method of claim 12 wherein the financial data is a currency valuation.

14. The method of claim 12 wherein the financial data is a securities valuation.

15. A computer system for applying interval-based adjustments to data in a database, comprising:
   a first database structure storing, in the computer system, a plurality of raw data values organized as a series;
   a second database structure storing, in the computer system, a plurality of intervals of adjustment data for the series of raw data values, each interval of adjustment data including an adjustment value to be applied to raw data values over a specified range in the series, wherein the adjustment data includes data for a pending adjustment;
   an adjustment value computed from the data for a pending adjustment in response to retrieval of an adjusted data value from the database; and
   an association between the first and second database structures in the computer system so the adjustment value is applied to the series of raw data values in response to retrieval of an adjusted data value from the database in the computer system to provide a user, via the computer system, the adjusted data values corresponding to said raw data values and said adjustment value.

16. The system of claim 15 further wherein:
   the adjustment value for each interval of adjustment data is computed in response to the addition of a subsequent interval of adjustment data.

17. The system of claim 15 wherein the association comprises a map structure mapping the second database structure to the first database structure.

18. The system of claim 15 wherein the raw data values represent a time series.

19. The system of claim 18 wherein the time series tracks financial data.

20. The system of claim 19 wherein the financial data is a currency valuation.

21. The system of claim 19 wherein the financial data is a securities valuation.

22. The system of claim 18 wherein the association comprises a view of the database that includes the raw data values and the adjustment value.

23. A computer system for applying interval-based adjustments to data in a database, comprising:
   a first database structure storing, in the computer system, a plurality of raw data values organized as a time series;
   a second database structure storing, in the computer system, a plurality of intervals of time-based adjustment data for the time series, each interval of time-based adjustment data including an adjustment value to be applied to raw data values over a specified range in the series, wherein the adjustment data includes data for a pending adjustment;
   a view of the database including the first and second database structures;
   an adjustment value computed from the data for a pending adjustment in response to retrieval of an adjusted data value from the database; and
   in response to a query for adjusted data values, input to the computer system by a user, using the view to apply the adjustment value to the raw data values during retrieval of the raw data from the database in the computer system to provide the user with the adjusted data values corresponding to said raw data values and said adjustment value via the computer system.

24. The system of claim 23 wherein the adjustment value for each interval of adjustment data is computed in response to the addition of a subsequent interval of adjustment data.

25. The system of claim 23 wherein the view comprises a map structure mapping the second database structure to the first database structure.

26. The system of claim 23 wherein the time series tracks financial data.

27. The system of claim 26 wherein the financial data is a currency valuation.

28. The system of claim 26 wherein the financial data is a securities valuation.

29. A computer system including an article of manufacture, the article of manufacture comprising a computer-readable medium including computer instructions encoded on the medium, the instructions causing the computer system to apply interval-based adjustments to data in a database, the database stored within, and accessible via, the computer system, the article comprising instructions for:
   storing a plurality of raw data values organized as a series in a first database structure in the computer system;

storing a plurality of intervals of adjustment data in a second database structure in the computer system for the series of raw data values, each interval of adjustment data including an adjustment value to be applied to raw data values over a specified range in the series, wherein the adjustment data includes data for a pending adjustment;

computing an adjustment value from the data for a pending adjustment in response to retrieval of an adjusted data value from the database; and associating the first and second database structures in the computer system so the adjustment value is applied to the series of raw data values in response to retrieval of an adjusted data value from the database in the computer system to provide a user, via the computer system, the adjusted data values corresponding to said raw data values and said adjustment value.

30. The article of claim 29 further comprising instructions for:

computing the adjustment value for each interval of adjustment data in response to the addition of a subsequent interval of adjustment data.

31. The article of claim 29 wherein associating comprises mapping the second database structure to the first database structure.

32. The article of claim 29 wherein the raw data values represent a time series.

33. The article of claim 32 wherein the time series tracks financial data.

34. The article of claim 33 wherein the financial data is a currency valuation.

35. The article of claim 33 wherein the financial data is a securities valuation.

36. The article of claim 32 wherein associating comprises creating a view of the database that includes the raw data values and the adjustment value.

37. A computer system including an article of manufacture, the article of manufacture comprising a computer-readable medium including computer instructions encoded on the medium, the instructions causing the computer system to apply interval-based adjustments to data in a database, the database stored within, and accessible via, the computer system, the article comprising instructions for:

storing a plurality of raw data values organized as a time series in a first database structure in the computer system;

storing a plurality of intervals of time-based adjustment data in a second database structure in the computer system for the time series, each interval of time-based adjustment data including an adjustment value to be applied to raw data values over a specified range in the series, wherein the adjustment data includes data for a pending adjustment;

creating a view of the database in the computer system to include the first and second database structures;

computing an adjustment value from the data for a pending adjustment in response to retrieval of an adjusted data value from the database; and in response to a query for adjusted data values, input to the computer system by a user, using the view to apply the adjustment value to the raw data values during retrieval of the raw data from the database in the computer system to provide the user with the adjusted data values corresponding to said raw data values and said adjustment value via the computer system.

38. The article of claim 37 further comprising instructions for computing the adjustment value for each interval of adjustment data in response to the addition of a subsequent interval of adjustment data.

39. The article of claim 37 wherein creating the view comprises mapping the second database structure to the first database structure.

40. The article of claim 37 wherein the time series tracks financial data.

41. The article of claim 40 wherein the financial data is a currency valuation.

42. The article of claim 40 wherein the financial data is a securities valuation.

43. In a computer system, a method of applying interval-based adjustments to data in a database, comprising:

storing a plurality of raw data values organized as a time series in a first database structure in the computer system;

for the time series, storing a plurality of intervals of time-based adjustment data in a second database structure in the computer system, each interval of time-based adjustment data including an adjustment value to be applied to raw data values over a specified range in the series, the adjustment value for each interval reflecting adjustment values for subsequent intervals, wherein the adjustment data includes data for a pending adjustment;

creating a view of the database in the computer system to include the first and second database structures;

computing an adjustment value from the data for a pending adjustment in response to retrieval of an adjusted data value from the database; and in response to a query for adjusted data values, input to the computer system by a user, using the view to apply the adjustment value to the raw data values during retrieval of the raw data from the database in the computer system to provide the user with the adjusted data values corresponding to said raw data values and said adjustment value via the computer system.

44. The method of claim 43 further comprising computing the adjustment value for each interval of adjustment data in response to the addition of a subsequent interval of adjustment data.

45. The method of claim 43 wherein creating the view comprises mapping the second database structure to the first database structure.

46. The method of claim 43 wherein the time series tracks financial data.

47. The method of claim 46 wherein the financial data is a currency valuation.

48. The method of claim 46 wherein the financial data is a securities valuation.

49. A computer system for applying interval-based adjustments to data in a database, comprising:

a first database structure storing, in the computer system, a plurality of raw data values organized as a time series;

a second database structure storing, in the computer system, a plurality of intervals of time-based adjustment data for the time series, each interval of time-based adjustment data including an adjustment value to be applied to raw data values over a specified range in the series, the adjustment value for each interval reflecting adjustment values for subsequent intervals, wherein the adjustment data includes data for a pending adjustment;

a view of the database including the first and second database structures;

an adjustment value computed from the data for a pending adjustment in response to retrieval of an adjusted data value from the database; and in response to a query for adjusted data values, input to the computer system by a user, using the view to apply the adjustment value to the raw data values during retrieval of the raw data from the database in the computer system to provide the user with the adjusted data values corresponding to said raw data values and said adjustment value via the computer system.

50. The system of claim 49 wherein the adjustment value for each interval of adjustment data is computed in response to the addition of a subsequent interval of adjustment data.

51. The system of claim 49 wherein the view comprises a map structure mapping the second database structure to the first database structure.

52. The system of claim 49 wherein the time series tracks financial data.

53. The system of claim 52 wherein the financial data is a currency valuation.

54. The system of claim 52 wherein the financial data is a securities valuation.

55. A computer system including an article of manufacture, the article of manufacture comprising a computer-readable medium including computer instructions encoded on the medium, the instructions causing the computer system to apply interval-based adjustments to data in a database, the database stored within, and accessible via, the computer system, the article comprising instructions for:

storing a plurality of raw data values organized as a time series in a first database structure in the computer system;

storing a plurality of intervals of time-based adjustment data in a second database structure in the computer system for the time series, each interval of time-based adjustment data including an adjustment value to be applied to raw data values over a specified range in the series, the adjustment value for each interval reflecting adjustment values for subsequent intervals, wherein the adjustment data includes data for a pending adjustment;

creating a view of the database in the computer system to include the first and second database structures;

computing an adjustment value from the data for a pending adjustment in response to retrieval of an adjusted data value from the database; and in response to a query for adjusted data values, input to the computer system by a user, using the view to apply the adjustment value to the raw data values during retrieval of the raw data from the database in the computer system to provide the user with the adjusted data values corresponding to said raw data values and said adjustment value via the computer system.

56. The article of claim 55 further comprising instructions for computing the adjustment value for each interval of adjustment data in response to the addition of a subsequent interval of adjustment data.

57. The article of claim 55 wherein creating the view comprises mapping the second database structure to the first database structure.

58. The article of claim 55 wherein the time series tracks financial data.

59. The article of claim 28 wherein the financial data is a currency valuation.

60. The article of claim 58 wherein the financial data is a securities valuation.

* * * * *